Dec. 30, 1941.  J. F. HALL  2,268,201
WATCHMAKER'S TOOL
Filed Aug. 2, 1940
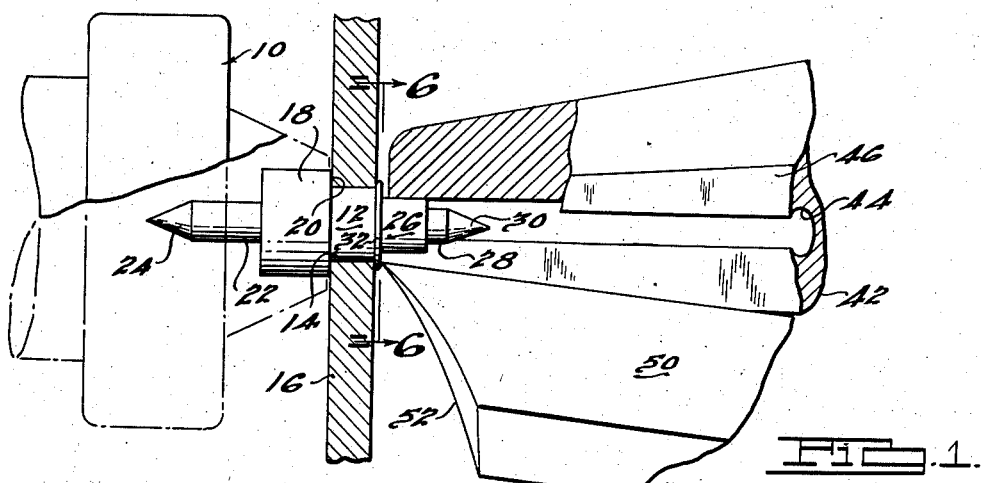
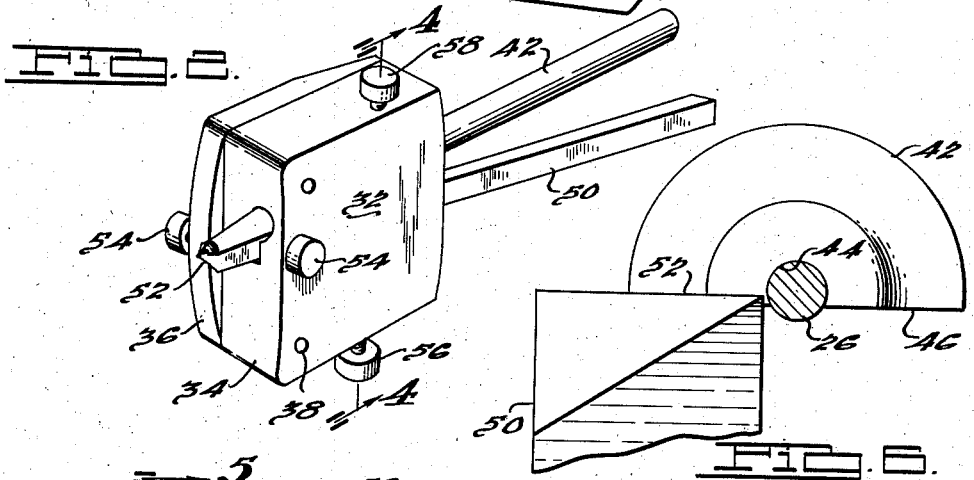
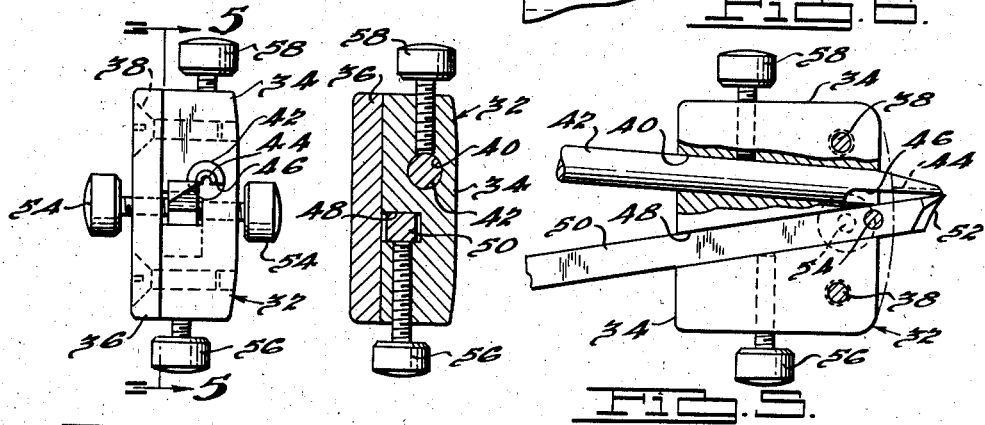
INVENTOR
John F. Hall.
BY
Harness, Dickey & Pierce.
ATTORNEYS.

Patented Dec. 30, 1941

2,268,201

UNITED STATES PATENT OFFICE 2,268,201

WATCHMAKER'S TOOL

John F. Hall, Port Huron, Mich.

Application August 2, 1940, Serial No. 349,510

4 Claims. (Cl. 82—35)

This invention relates to metal cutting tools of the class employed by watch makers and has for its principal object the provision of a tool of the type described particularly designed to remove the burr or flange formed in the operation of staking a gear or wheel upon a spindle or staff.

Objects of the invention include the provision of a tool for removing the burr or flange formed in the operation of staking a gear or wheel upon a spindle or staff including a part adapted to receive the spindle or staff therein and an associated cutting tool adjustably fixed with respect thereto and capable of operating upon the burr or flange to remove the same, thereby to facilitate the separation of the gear or wheel from the spindle or staff; the provision of a tool of the type described including a guiding member having a bore therein for receiving the spindle or staff for the purpose of guiding the tool, and having a portion of the guiding member cut away to expose the spindle or staff and to provide clearance to permit the point of the cutting tool to closely approach the surface of the spindle or staff; the provision of a tool of the class described including a body in which the guiding member is removably received, whereby the guiding member may be replaced by another guiding member having a bore of different size to receive a different size spindle or staff; the provision of a tool of the class described including a body member in which a guiding member for the spindle or staff is adjustably fixed and which body member carries the cutting tool for removing the burr; the provision of a tool of the class described in which the cutting tool is axially adjustable in the body member and at an acute angle to the axis of the guiding member; the provision of a tool of the class described in which the cutting tool is so supported and arranged as to permit lateral shifting of the cutting points thereof to accommodate the tool for use with spindles or staffs of different diameters; and the provision of a tool of the class described that is simple in construction, efficient in operation, and economical to produce.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views, Figure 1 is a more or less diagrammatic, partially broken and partially sectioned view illustrating the staff of a balance wheel of a watch suitably supported in a lathe collet, and illustrating a fragment of the tool constructed in accordance with the present invention arranged in operative relation with respect thereto and in a position to remove the burr or flange formed in the operation of staking the balance wheel to its staff;

Fig. 2 is a perspective view of my improved tool;

Fig. 3 is an end elevational view of the tool shown in Fig. 2;

Fig. 4 is a transverse sectional view, taken on the line 4—4 of Fig. 2;

Fig. 5 is a partially broken, partially sectional view, taken on the line 5—5 of Fig. 3; and Fig. 6 is an enlarged fragmentary end view of the guiding member and cutting tool taken on the line 6—6 of Fig. 1.

In the watch making and similar arts employing small wheels or gears fixed upon staffs or spindles, for the purpose of assembling them it is conventional practice to provide the staff or spindle with a cylindrical portion that is to be accurately received in the bore of the wheel or gear, a shoulder is provided at one end of such cylindrical portion to limit the movement of the wheel or gear axially in that direction, and the cylindrical portion is made of such length that the end thereof opposite the shoulder projects a short distance beyond the corresponding face of the wheel or gear and is upset by a staking operation over such face of the wheel or gear for the purpose of fixing the latter to the staff or spindle. Where wear or damage to the assembly occurs, it is usually in the staff or spindle, and particularly in the case of balance wheels which are of relatively expensive construction, economy dictates the replacement of the staff or spindle only, rather than the replacement of the entire assembly by a new one. In such case it requires removal of the burr or flange mentioned before removal of the staff or spindle from the wheel or gear is possible without damage to the latter. This has been conventionally accomplished by supporting the assembly in the collet of a lathe for rotation about the axis of the staff or spindle, and by manually manipulating a conventional form of cutting tool during rotation of the assembly, the burr or flange has been cut away.

Where the parts are extremely small, such as for instance, found in the smaller types of watches, the above described conventional operation is difficult at its best and often results in damage to the gear or wheel, requiring replacement of the latter. By using a tool constructed in accordance with the teachings of the present invention, such burrs may be removed in a quick, accurate and efficient manner, eliminating the possibility of damage to the gear or wheel.

Referring now to the accompanying drawing and particularly to Fig. 1, the numeral 10 indicates generally a collet chuck of a lathe in which the staff of a balance wheel is secured, the particular staff shown being illustrative of the general type of construction conventionally employed, although the invention is applicable for use with other types. The particular staff shown comprises a cylindrical portion 12 which is closely received in the bore 14 of the cross arm or bar 16 of a balance wheel. The staff at one end of the portion 12 is enlarged as at 18 to form a shoulder 20 against which the cross arm or bar 16 is adapted to abut. The staff also includes a co-axial spindle portion 22 extending axially to the left of the portion 20 and which portion 22 terminates in a pointed bearing end 24. To the right of the portion 12, the staff includes a coaxial, cylindrical extension 26, and a relatively short and smaller spindle portion 28 terminating in another pointed bearing portion 30. The portion 12 is conventionally made longer in an axial direction than the thickness of the cross arm or bar 16 and in order to secure the staff to the balance wheel, that part of the portion 12 extending to the right of the face of the cross arm or bar 16 is upset by a suitable and conventional staking operation to form a burr or flange 32 overlying the right hand face of the cross arm or bar 16 about the margins of the bore 14 thereof. It will be appreciated that it will be necessary to remove the upset portion 32 before it is possible to remove the staff from the balance wheel, and the tool of the present invention is particularly designed to remove such upset portions or burrs.

Referring now particularly to Figs. 2, 3, 4, and 5 which illustrate a suitable embodiment of the tool of the present invention, it will be noted that the tool comprises a main body portion indicated generally at 32, formed in two parts 34 and 36, respectively, which parts have mating plane faces and are suitably fixed together by means of screws 38. The part 34 has a cylindrical bore 40 therethrough in which is axially slidably received a generally cylindrical guiding member 42, the operative end of which is initially machined into a more or less frusto conical point terminating in a rounded nose and such end is axially drilled to provide a bore 44 therein. After such end has been turned down and drilled, it is then cut away as probably best shown in Figs. 3 and 5 to provide a flat surface 46 lying in a plane parallel to the axis of the member 42 and to such an extent as to intersect the bore 44 but without extending to the diameter of the bore. This permits a cylindrical workpiece of substantially the same diameter as the bore 44 to be received therein and maintained against lateral displacement in the bore but with a portion of the surface thereof exposed above or outwardly of the plane of the surface 46.

The bore 44 is adapted to receive the portion 26 of the spindle illustrated in Fig. 1, or equivalent portions of other spindles. The portion 26 of the spindle or staff shown is adapted to be relatively closely received within the bore 44 but sufficiently freely to permit its ready rotation therein without binding. It will be understood that a series of guide members 42 will be provided with each tool, each guide member having a bore equivalent to the bore 44 therein but of a diameter different from all of the rest of the members in the series, so as to adapt the tool for receiving portions of spindles or shafts of different diameters. The amount which the coned ends of the members 42 will be machined away to provide the surface portion 46, may, of course, vary with the diameter of the bore therein, the larger the bore the less material required to be machined away to provide the surface 46 or its equivalent.

In that face of the member 34 which meets the member 36 a rectangular sectioned groove 48 is formed, the groove extending in converging relation with respect to the bore 30, as best illustrated in Fig. 5, but being somewhat offset from the axis of the bore 40, as brought out in Fig. 4. In the groove 48 is received a cutter 50, the operative end of which is ground away to provide a cutting edge 52, preferably arranged at an acute angle with respect to the length of the cutter 50. Although the cutter 50 may be of square or rectangular section, it is shown as of square section for the purpose of illustration and as is usually preferable. The groove 48 adjacent the lefthand end of the body 34, as viewed in Fig. 5, is of a depth substantially equal to the thickness of the cutter blade 50, but, at its righthand end, as viewed in Fig. 5, the groove 48 is considerably deeper than the thickness of the cutter 50 so as to permit the operative end of the cutter 50 movement laterally in the groove at such end, the cutter having a more or less pivotal action about its line of contact with the edges of the groove at the opposite end of the body. The lateral position of the operative end of the cutter 50, in other words, the lateral position of the cutting edge 52, is controlled by means of a pair of set or clamping screws 54 threaded through the portions 34 and 36, respectively, of the body 32, and engaging opposite sides of the cutter 50 adjacent the deep end of the slot 48. Axial movement of the cutter 50 in the groove 48 is governed by a similar set or clamping screw 56 threaded through the corresponding edge of the part 34 and engaging a side face of the cutter ninety degrees removed from the faces engaged by the screws 54. A similar screw 58 threaded through the opposite edge of the part 34 serves to clamp the guide member 42 in axially adjustable and rotatable position in the bore 40.

In operation the guide member 42 is rotated to bring the surface 46 thereof into opposed flatwise relation with respect to the opposed face of the cutter 50, and the cutter 50 is arranged in the groove 48 so as to bring the point of cutting edge 52 thereof in the cooperative relationship with respect to the surface 46, and the guide 42 and cutter 50 are adjusted axially in the body 32 so as to bring the cutter 50 into substantial contact with the surface 46 at the extreme end thereof and with the point of the cutting edge 52 projecting beyond the end of the guide 42 a distance preferably equal to the thickness of the burr or flange to be removed from the particular spindle or staff to be operated upon, the relation of the parts in this respect probably being best brought out in Fig. 1. It will be appreciated that this adjustment is readily accomplished due to the converging relation of the guide member 42 and cutter 50. Also, in operation, by suitably manipulating the screws 54, the point of the cutting edge 52 may be moved in a lateral and more or less radial direction with respect to the axis of the bore 44 and consequently of the staff or spindle being operated upon, over the surface 46, to correctly position the point of the cutting edge 52 for removal of the burr or flange 32 when the tool is applied to the work in the manner illustrated in Fig. 1.

Consequently, in employing the tool for removing the burr or flange 32 from a staff or spindle, a guide member 42 is first selected having a bore 44 therein of the proper diameter to fit that portion of the staff or spindle immediately outwardly of the burr or flange to be removed, and such guide member is then inserted in the body 32. The guide member 42 and cutter 50 are then adjusted axially in the body member 32 until the point of the cutting edge 52 projects the desired distance beyond the nose of the guide member 42 and in proper relation to the surface 46 thereof, and then both are locked against axial and rotational movement by means of the screws 56 and 58. The screws 54 are then manipulated to move the point of the cutting edge 52 to bring it to the proper radial distance from the axis of the bore 44 required to remove the burr or flange 32, and the device is then ready for operation. The wheel or gear with the staff or spindle, which it is desired to remove therefrom, is then inserted in a suitable collet of a lathe with the burr or flange to be removed facing outwardly from the collet, as illustrated in Fig. 1, the lathe is set in rotation, and the tool is simply grasped in the operator's hand and applied to the work with the guide member 42 in substantial axial alignment with the staff or spindle of the work and the end of the guide member 42 is caused to sleeve over the exposed end of the spindle or staff and the whole device is then pressed inwardly towards the work so as to bring the point of the cutting edge 52 into cutting relation with respect to the burr or flange 32 to be removed, as indicated in Fig. 1, the cutting edge thereby removing the burr or flange.

It will be readily appreciated from the above description that with this device the guide member 42 serves to pilot the device upon the spindle and thereby positively positions the cutting edge 52 with respect to the burr or flange to be removed from the work, and such burr or flange is removed without any possible danger of damaging the wheel or gear. Inasmuch as contact of the nose of the guiding member 42 with the shoulder provided on the spindle or staff for staking purposes serves to limit the penetration of the cutting point of the tool into the work, it will be readily understood that by the use of this tool it is impossible, where properly initially adjusted, to remove any greater amount of metal than that required to complete the desired operation, or, in other words, it prevents the removal of such amount of metal as might permanently damage the wheel or gear associated with the work. It will also be appreciated that the entire operation of setting up and adjusting the tool and actually applying it to the work and completing the machining on the work may be accomplished in a portion only of the time here required to explain such adjustment and operation.

Formal changes may be made in the specific embodiment of the invention described without departing from the spirit or substance of the broad invention, the scope of which is commensurate with the appended claims.

What is claimed is:

1. In a device of the type described, in combination, a body member, an elongated cylindrical guide bar projecting through and longitudinally slidable in said body member and having an operating end provided with a bore therein for receiving and guiding said device relative to a piece of work, said end being segmentally cut away to provide a plane surface lying in intersecting relationship with respect to said bore and in approximate parallelism with the axis thereof, a cutter carried by said body member and having a cutting edge arranged in close proximity to said surface, and means for varying the position of said cutting edge in the approximate plane of said surface.

2. In a device of the type described, in combination, a body member, an elongated cylindrical guide member projecting through said body member and having an operating end provided with an axial bore therein for receiving and guiding said device relative to a piece of work, said end being segmentally cut away to provide a surface lying in intersecting relationship with respect to said bore and in approximate parallelism with and spaced from the axis thereof, an elongated cutter member projecting through and carried by said body member and having a cutting edge arranged in close proximity to said surface, and means for adjusting the angularity between the longitudinal axes of said guide member and cutter whereby to adjust the position of said cutting edge transversely with respect to the axis of said guide member.

3. In a device of the type described, a body member having a pair of openings therethrough, an elongated guide member received in one of said openings and projecting from opposite sides of said body member and held against substantial movement transversely of its axis therein, an elongated cutter member projecting through the other of said openings and being longitudinally slidable and angularly adjustable with respect to the axis of said guide member therein, said guide member having a bore in one end thereof for reception of a piece of work and said end being segmentally cut away to provide a surface intersecting said bore, said cutter member having a cutting point arranged in approximate contact with said surface and movable transversely thereof upon adjustment of the angularity of said cutter member with respect to said guide member, and means for adjusting the angularity of the axis of said cutter member with respect to the axis of said guide member and for locking said cutter member in adjusted position.

4. In a device of the type described, in combination, a body member having a cylindrical opening therethrough, a cylindrical guide member slidably received in said opening and projecting from opposite ends thereof, a second opening in said body member disposed at an angle with respect to the first mentioned opening and having a greater dimension at one end thereof than at the opposite end thereof, an elongated cutter member received in said second opening, said cutter member approximately fitting said second opening at the small end thereof and being transversely movable in said opening at the large end thereof whereby to provide for pivotal adjustment of said cutter member in said opening about a line adjacent the small end of said opening, one end of said guide member having an axial opening therein and being segmentally cut away to provide an approximately plane surface intersecting said axial bore, said guide member having a cutting point arranged in approximate contact with said surface and movable transversely thereof upon pivotal adjustment of said cutter member, and means for locking said cutter member in pivotally adjusted position.

JOHN F. HALL.